July 29, 1958

C W. MUSSER ET AL 2,844,905

TELESCOPIC UNIPOD

Filed Nov. 21, 1952

INVENTORS
C WALTON MUSSER
ALBERT BENDITT
LLOYD W. INSETTA
BY
ATTORNEYS:

July 29, 1958

C W. MUSSER ET AL 2,844,905

TELESCOPIC UNIPOD

Filed Nov. 21, 1952

INVENTORS
C WALTON MUSSER
ALBERT BENDITT
LLOYD. W. INSETTA
BY
ATTORNEYS

July 29, 1958 C W. MUSSER ET AL 2,844,905
TELESCOPIC UNIPOD
Filed Nov. 21, 1952 5 Sheets-Sheet 3
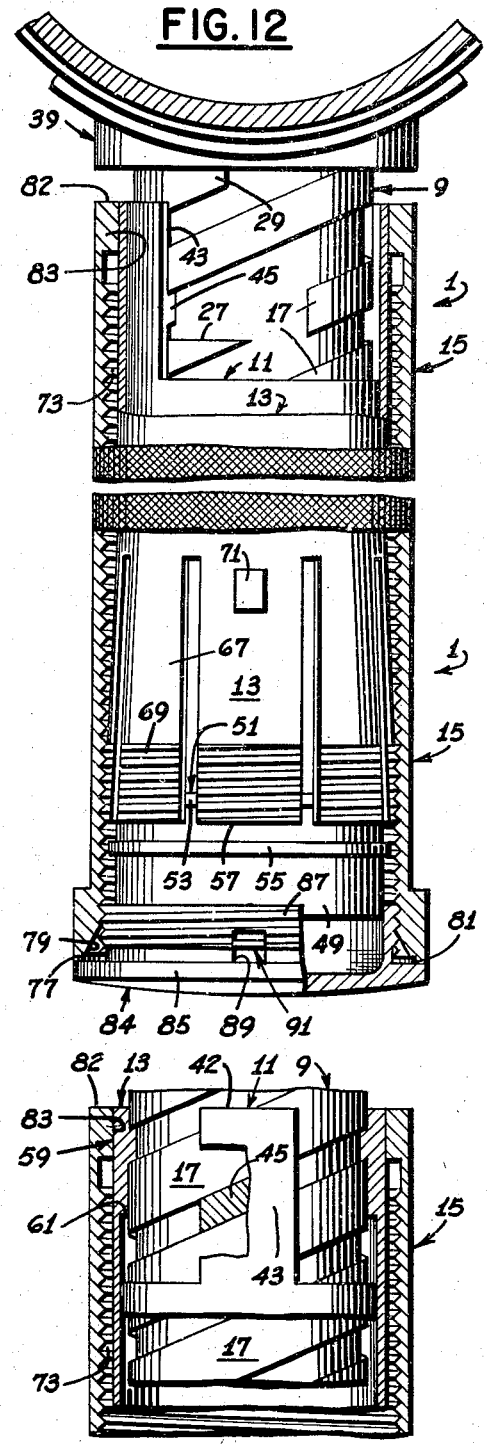
FIG. 12
FIG. 13
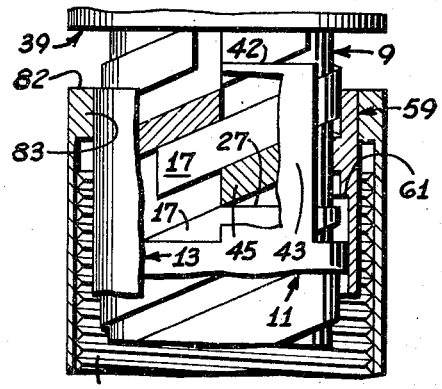
FIG. 14
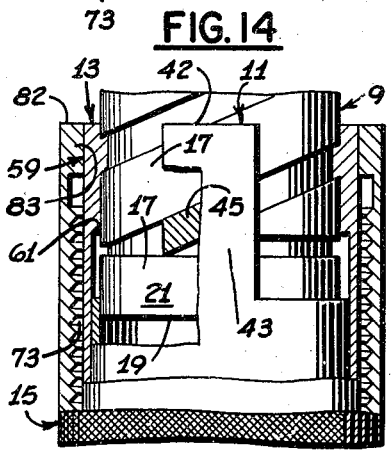
FIG. 13A
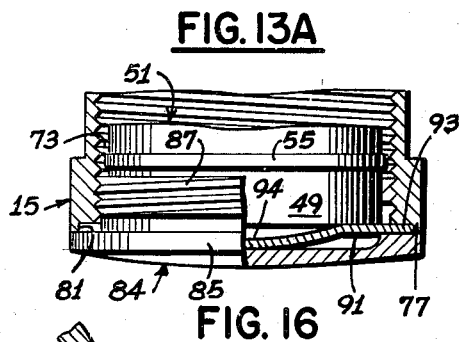
FIG. 16
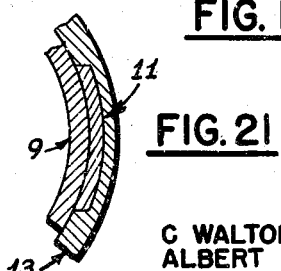
FIG. 21
INVENTORS
C WALTON MUSSER
ALBERT BENDITT
LLOYD W. INSETTA
BY
ATTORNEYS:

INVENTORS
C WALTON MUSSER
ALBERT BENDITT
LLOYD W. INSETTA
ATTORNEYS

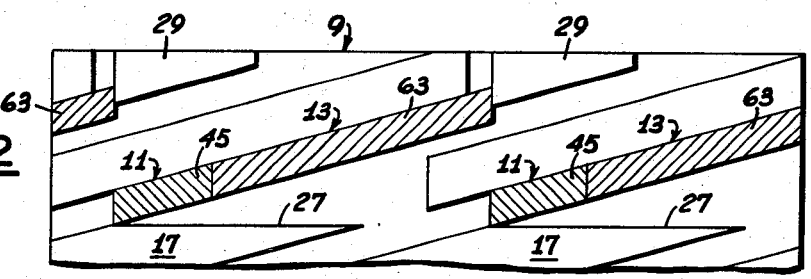
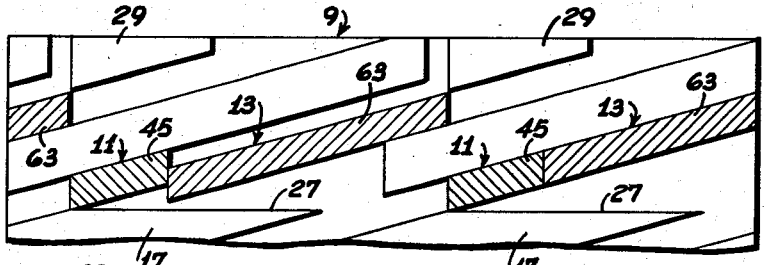
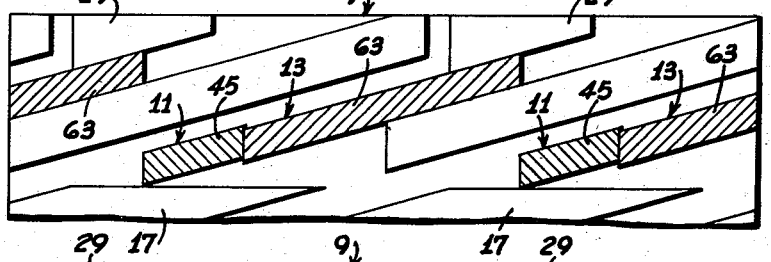
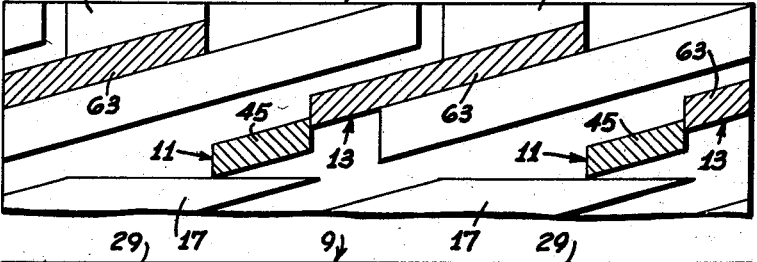
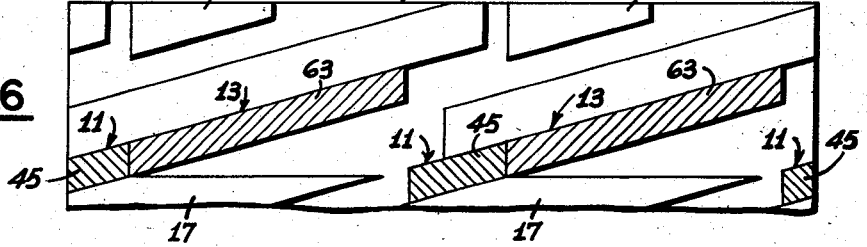

United States Patent Office 2,844,905
Patented July 29, 1958

2,844,905
TELESCOPIC UNIPOD

C Walton Musser, Albert Benditt, and Lloyd W. Insetta, Philadelphia, Pa., assignors to the United States of America as represented by the Secretary of the Army Application November 21, 1952, Serial No. 321,962

6 Claims. (Cl. 42—94)

(Granted under Title 35, U. S. Code (1952), sec. 266)

The invention described herein may be manufactured and used by or for the Government for governmental purposes without the payment of any royalty thereon.

The present invention relates to a telescopic device and more particularly to a unipod of the kind especially useful as a support for portable weapons.

Weapons of the kind stated above are relatively light weight, hence portable, and are designed to be fired either from off-the-shoulder or from a prone position at an emplacement. In the latter case, the rifle is provided with a combination of supports, such as a unipod and a bipod, which together form a tripod. In most cases, the bipod is located in a position toward the rear of the rifle and the unipod in a position forwardly thereof. The unipod is usually made adjustable, that is, extendable by employing a plurality of telescoping members, thereby to compensate for elevating the rifle to an adjusted firing position. If, however, the rifle is to be fired from the shoulder, the bipod can be quickly removed from the rifle or otherwise pivoted to a position out of the way. In such case, the unipod is useful as a handle for supporting and steadying the rifle.

In spite of the fact that many prior art supports employing unipods have been quite successful, they still have been found to have various shortcomings. For example, in order to extend the telescopic members of the unipod for elevation adjustment purposes, most devices require the use of both hands of the operator, one hand for locking and unlocking while the other hand adjusts the components. In other cases, the parts are complicated insofar as assembly and disassembly is concerned. Other devices are difficult to maintain in a locked, adjusted position. In others, not all of the telescoping members are adjustable to partly extended positions but require full extension or withdrawal thereof.

It is, therefore, a primary object of the present invention to provide an improved unipod construction which will overcome the above and other disadvantages of prior art unipods.

It is also an object of the present invention to provide for firearms a unipod which can be quickly and easily adjusted.

A further object of the present invention is to provide for a unipod a simple means of adjustment with requires the use of but one hand of the operator to effect such adjustment.

Still further, it is an object of the present invention to provide a unipod which can be quickly and easily assembled and disassembled.

Another object of the present invention is to provide a positive locking means for the telescoping members of a unipod regardless of the adjusted position of the members.

Still another object of the present invention is to provide for the unipod telescoping members an end closure member which can be locked in place, thereby preventing inadvertent removal or accidental loss thereof.

It is another object of the present invention to provide for a firearm a unipod which is relatively simple in construction, efficient in operation and inexpensive to manufacture.

In accordance with the present invention, the unipod comprises four sleeves arranged in telescopic relation respectively one within the other. For convenience of reference hereinafter, they have been termed, from within outward, the innermost, second, third and outermost sleeves. The innermost sleeve is arranged for adjustment by rotating it with respect to the others, thereby to move it between a fully inserted position within the second sleeve and a substantially fully withdrawn position therefrom. The third sleeve is slidable in a longitudinal direction within the outermost sleeve for adjustment to an extended position therefrom. Locking means is provided to hold the third sleeve in an adjusted position within the outermost sleeve and the innermost sleeve is arranged for adjustment only in the locked position of the third sleeve. Locking and unlocking is effected by a simple rotative and longitudinal movement of the three outer sleeves with respect to the innermost sleeve.

The novel features of the present invention, both as to its organization and method of operation, as well as additional objects and advantages thereof, will be understood better from the following description, when read in connection with the accompanying drawings in which a single preferred embodiment of the present invention is represented:

Fig. 12 is a view similar to Fig. 8, as seen along the line 12—12 thereof;

Fig. 13 is a sectional view of a portion of the unipod showing the relative position of the telescopic members, the innermost sleeve being partly extended from the second sleeve;

Fig. 13A is a view similar to Fig. 13, but showing the innermost sleeve fully extended from the second sleeve;

Fig. 14 is a sectional view, similar to Fig. 13, showing the relationship of the telescopic members preparatory to locking or unlocking of the outermost sleeve with the third sleeve;

Fig. 16 is a sectional view of a portion of the base of the unipod and showing the end cap locked in place, the view being taken along the line 16—16 of Fig. 15;

Fig. 21 is a sectional view of a portion of the unipod, taken along the line 21—21 of Fig. 19;

Figs. 22 through 24 are a series of developed views of the upper threaded portions of the three inner sleeve members illustrating various steps in the process of disassembly of these members as follows:

Fig. 22 shows the locked position of the members, the innermost sleeve having been rotated to a fully inserted position within the second sleeve;

Fig. 23 shows the third sleeve's thread portion moved rearwardly or downwardly to align it with the thread runout portion of the innermost sleeve;

Fig. 24 shows the third sleeve's thread portion partly advanced into the thread runout portion of the innermost sleeve and the second sleeve's thread portion in alignment with the thread runout portion;

Figure 1:
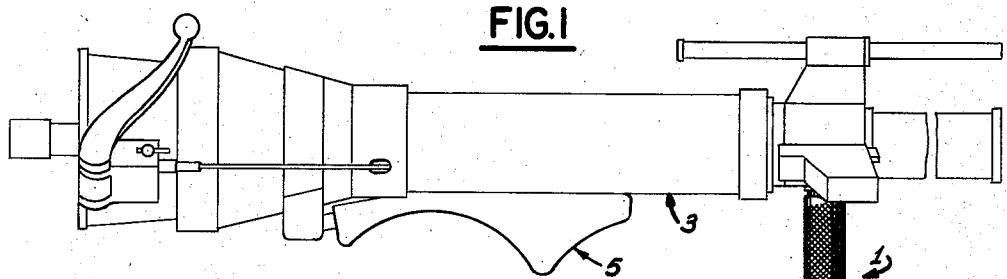
Fig. 1 is a side view of a firearm provided with a combination support including a unipod in accordance with the present invention and a bipod, a portion of the firearm being broken away.

Fig. 25 is a developed view similar to Figs. 22 through 24 but showing the relative positions of the threaded portions of the three inner sleeves, the third sleeve having been disengaged from its locked position with the outermost sleeve; and Fig. 26 is a view, similar to Fig. 25, showing the threaded portions aligned to allow rotative adjustment of the innermost sleeve with respect to the other sleeves.

Referring more particularly to the drawings, wherein similar reference characters are used to designate corresponding parts throughout, the unipod 1 of the present invention is shown and described as part of a combination support for a recoilless rifle 3. The support comprises a combination unipod 1 and bipod 5 both of which are mounted on the rifle and arranged in such a manner as to be adjustable with respect to each other and to provide a tripod type of support useful in emplacement firing.

The bipod

Figure 3:
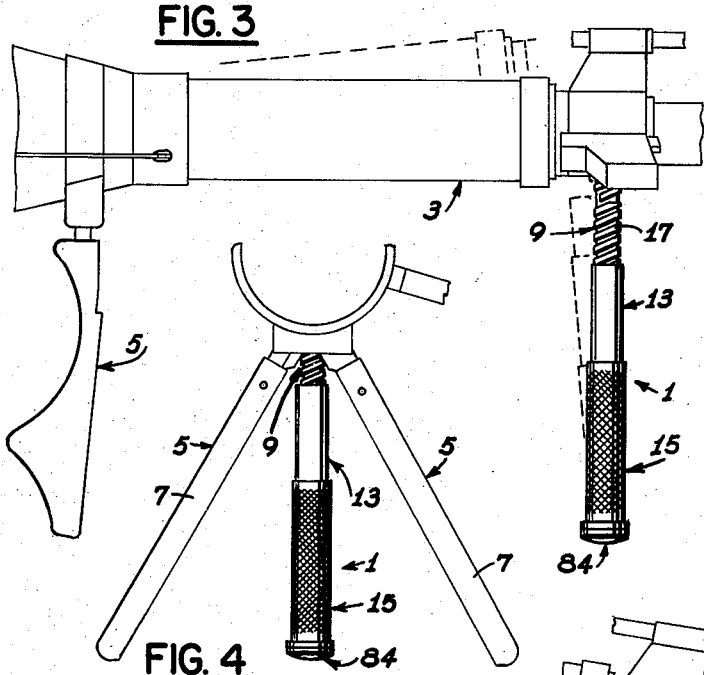
Fig. 3 is a side view similar to Fig. 1 but with other portions of the firearm broken away, the firearm being shown in two different elevated positions using the combination support as a tripod.
Figure 2:
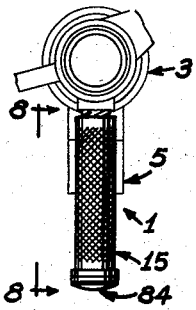
Fig. 2 is a front end view of the apparatus shown in Fig. 1, but with portions of the firearm broken away.
Figure 4:
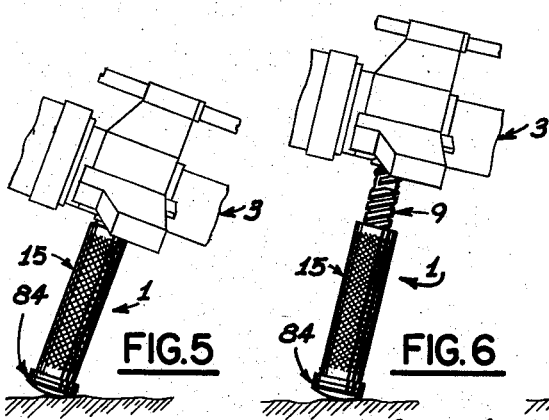
Fig. 4 is a rear view of a portion of the apparatus shown in Fig. 3, showing the relative positions of the unipod and bipod members when the firearm is used in an emplacement.

The bipod 5 is of any suitable type and is pivotally mounted in the vicinity of the rear chamber of the rifle for adjustment between two different positions. In the one position, the legs 7 are disposed close to and parallel to the chamber (see Fig. 1). In the other position, the legs are disposed laterally extended from and normal to the rifle (see Figs. 3 and 4). In the first-mentioned position, the bipod legs 7 are adapted to provide a shoulder support for the operator and the unipod 1 is disposed in a convenient position to provide a handle for supporting and steadying the rifle. In the second-mentioned position, the bipod legs 7 are arranged for adjustment to a spread apart position for placement on the ground, thereby to support the rear portion of the rifle above the ground, while the front portion of the rifle is similarly supported by the unipod 1. A bipod of the type referred to is shown, described and claimed in the copending application to C Walton Musser et al., Serial No. 321,961, filed concurrently herewith.

The unipod

Figures 5, 6, 7:
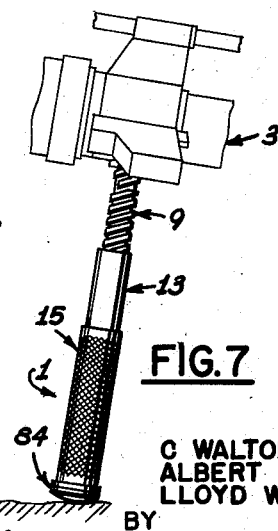
Fig. 5 is a side view of a portion of the apparatus shown in Fig. 1, the unipod being shown with its telescopic members disposed in a fully retracted position and used to support the firearm above the ground.
Fig. 6 is a view similar to Fig. 5, but showing the unipod disposed with the innermost sleeve partly extended.
Fig. 7 is a view similar to Fig. 5, but showing the innermost and the third sleeves disposed in a partly extended position.

The unipod 1 of the present invention comprises a plurality of sleeve members arranged telescopically respectively one within the other. The unipod is arranged for extension in an axial direction to permit elevation adjustment of the rifle when supported on the ground in the manner illustrated in Figs. 5 through 7 of the drawings, adjustment being accomplished through the telescopic arrangement of the sleeves.

In the particular embodiment shown, the unipod 1 comprises four sleeves or hollow cylinders 9, 11, 13, 15, otherwise referred to herein as the innermost sleeve 9, the second sleeve 11, the third sleeve 13 and the outermost sleeve 15.

The innermost sleeve

Figure 20:
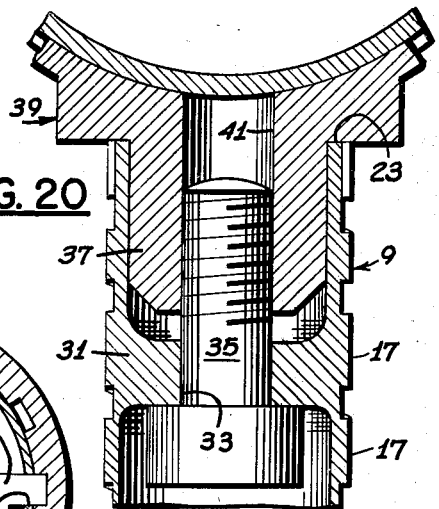
Fig. 20 is a sectional view, taken along the line 20—20 of Fig. 19, but showing only the innermost sleeve and a means of attaching the unipod to a firearm.

The innermost sleeve 9 has the external surface thereof provided with one or more helical threads 17. The threads are terminated at the lower or base end 19 of the sleeve by an annular shoulder 21. Adjacent to the opposite or upper end 23 of the sleeve, a portion of the threads are widened by cutting away a part of the land separating two adjacent grooves, in the manner indicated at 27 and as best shown in the developed views, Figs. 22 through 26. At the upper end of each groove, the land on one side (the upper side as viewed in the developed views) is somewhat widened thereby to provide a stop 29. In other words, continuity of the groove is interfered with by the stop 29 for a purpose hereinafter to be explained. A partition or wall 31 (see Fig. 20) is provided on the interior of the innermost sleeve 9 adjacent to the upper end 23 thereof. The wall 31 extends diametrically across the sleeve and is provided with an axial bore 33 for receiving a capscrew 35. The upper end 36 of the sleeve bore beyond the wall 31 is adapted to receive a cylindrical stud 37 of a bracket 39 provided for attaching the unipod 1 to the rifle 3. Thus, with the stud 37 disposed within the upper end of the innermost sleeve bore, the capscrew 35 is inserted through the wall bore 33 and is threadedly engaged with a threaded bore 41 provided in the stud.

The second sleeve

The second sleeve 11 comprises a hollow cylindrical member which is disposable about the innermost sleeve 9 and which is coextensive therewith. The sleeve 11 is cut away at its upper end 42 to provide two oppositely disposed ears or fingers 43 of arcuate cross-section. The inner surface of the sleeve including the fingers 43 is substantially smooth except for an inwardly extending helical rib 45 provided on each of the fingers 43, and an annular groove 47 adjacent to the lower end 49 of the sleeve proper. The ribs 45 are of a size and are arranged in a manner so as to mate with the external threaded surface of the innermost sleeve 9. The exterior surface of the second sleeve 11 is of uniform diameter throughout the greater portion of the length thereof. The lower end wall portion 51 of the sleeve is somewhat enlarged or thickened thereby to enlarge the external diameter and provide a shoulder or cam surface 53 useful for effecting a locking operation to be explained later herein. In addition, a narrow annular shoulder 55 is provided on the exterior of the lower end portion 51 intermediate the cam surface 53 and the lower end 49 of the sleeve.

The third sleeve

The third sleeve 13 comprises a hollow cylindrical member which is adapted for placement about the second sleeve 11. The third sleeve is of a length substantially equivalent to the length of the second sleeve as measured between the upper end 42 and a point immediately beyond the cam surface 53 on the lower end portion 51. In the assembled position of the second and third sleeves, the lower end 57 of the third sleeve is spaced from the annular shoulder 55 of the second sleeve to allow for limited longitudinal movement of the one sleeve with respect to the other. The inside diameter of the third sleeve is substantially uniform and slightly larger than the outside diameter of the second sleeve except for a relatively small inside wall portion 59 located at the upper end of the sleeve. The upper end wall portion 59 is enlarged or thickened to provide an annular shoulder 61 on the inside of the sleeve. The shoulder 61 is cut away at diametrically opposite points to provide axially extending grooves 62 of a size to receive the second sleeve fingers 43 with a slidable fit. In addition, the remaining portions or segments of the shoulder 61 are each provided with an inwardly extending helical rib 63. The ribs 63, like the second sleeve's ribs 45, are arranged to mate with the thread grooves of the innermost sleeve 9. When assembled together, the ribs of the second and third sleeves are complementary, that is, they are arranged to form a continuous rib for cooperation with the threads of the innermost sleeve.

The lower end 57 of the third sleeve is cut away along portions of the length thereof at spaced intervals around the circumference to provide a plurality of longitudinally extending resilient fingers 67. A portion 69 of the external surface of the third sleeve at the lower end thereof, that is, at the free ends of the fingers 67, is threaded to serve as part of a locking arrangement. In addition thereto, two oppositely disposed bosses 71 are also provided on the external surfaces of two oppositely disposed fingers 67.

The outermost sleeve

The outermost sleeve 15 is also a hollow, cylindrical member and is of a length greater than the lengths of each of the three inner sleeves. The outermost sleeve 15 has an internal diameter slightly larger than the external diameter of the third sleeve 13 so that it can be disposed thereabout with a slidable fit. The internal surface 73 of the sleeve is threaded complementary to the external threaded portion 69 of the third sleeve. Together the threaded surfaces 69, 73 of both sleeves function as a locking means for holding the two sleeves in a selected, extended position relative to each other. The interior surface 73 is cut away along its length to provide two oppositely disposed, axially extending grooves 75 for receiving the third sleeve's bosses 71. This arrangement prevents rotative movement of the outermost sleeve with respect to the third sleeve and serves to effect extension of the three outer sleeves with respect to the innermost sleeve. The lower end 77 of the outermost sleeve is chamfered at spaced intervals along the inner periphery to provide a plurality of grooves or slots 79. The lands 80 between the grooves are cut away at the lower ends thereof in a manner to provide an annular channel 81 on the inside at the lower end 77 of the outermost sleeve. The upper end 82 of the outermost sleeve is provided with an internal annular shoulder 83 which serves as a stop to prevent separation of the third sleeve from the outermost sleeve.

Figure 8:
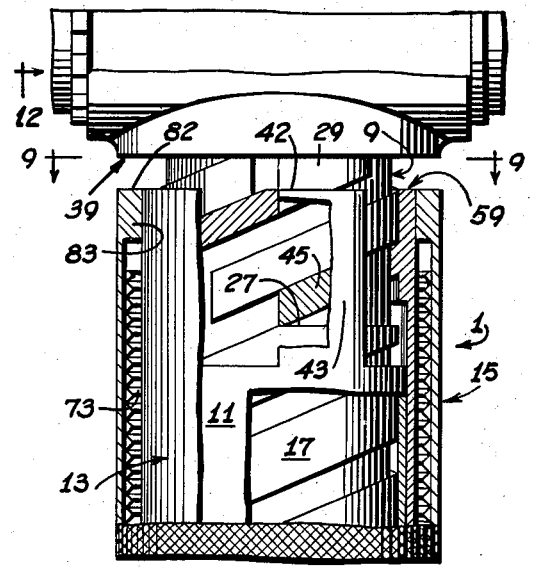
Fig. 8 is an enlarged fragmentary view of the unipod, partly in section, and with portions of the sleeve members broken away to show hidden parts.
Figure 9:
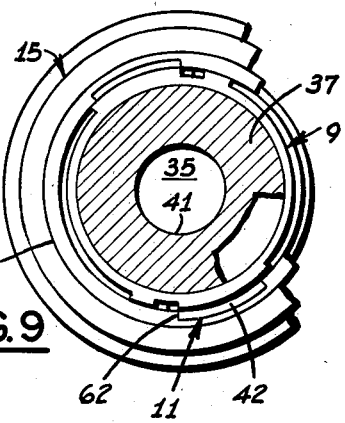
Fig. 9 is a sectional view of the unipod shown in Fig. 8, taken along the line 9—9 thereof.
Figure 10:
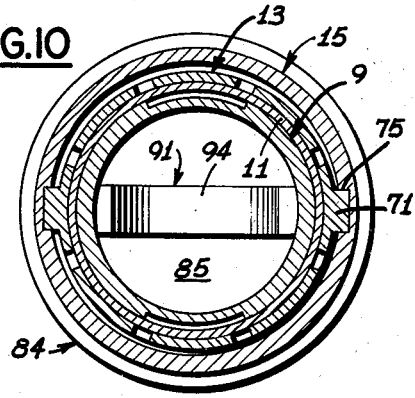
Fig. 10 is a sectional view similar to Fig. 9 but taken along the line 10—10 of Fig. 8.
Figure 11:
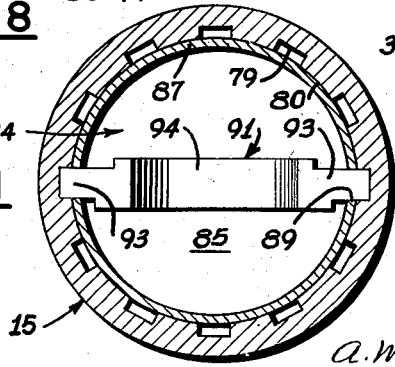
Fig. 11 is a sectional view of a portion of the base of the unipod, taken along the line 11—11 of Fig. 8.

In addition to the four telescopic sleeves, the unipod is provided with a closure member 84 for the lower ends of the sleeves. The closure member 84 comprises a disc-like cap 85 having a hollow, cylindrical body portion 87 extending from one side thereof. The cylindrical body portion 87 is externally threaded and arranged to mate with the internal threaded surface 73 of the outermost sleeve 15. Two oppositely disposed apertures 89 are provided in and extend through the wall of the body portion 87. A locking member 91, comprising a metal spring, extends diametrically across the body portion 87 and has the ends 93 thereof extending through the apertures 89 to an extent slightly beyond the outer threaded surface of the body portion. The locking member's center portion 94 is arcuate in shape and has the apex or intermediate portion thereof arranged to bear against the cap 85 with the ends 93 normally disposed spaced from the cap, in the manner shown in Fig. 8 of the drawings. With this arrangement, the ends of the spring 91 can be stressed toward the cap within the confines of the apertures 89.

Assembly of the unipod

In assembling the respective components of the unipod, the following procedure may be employed: The second sleeve 11 is inserted into the third sleeve 13 from the lower end 52 thereof. The fingers 43 of the second sleeve are disposed within the slots or grooves 62 of the third sleeve to an extent as to align the helical ribs 45, 63 of both sleeves to form a substantially continuous helical rib. In this aligned position of the helical ribs, the relative positions of the two sleeves is such as to dispose the free ends of the third sleeve's resilient fingers 67 over the cam surface 53 so that they are biased outwardly and extend onto the lower end wall portion 51 of the second sleeve.

The innermost sleeve 9 is then inserted into the second sleeve 11 from the latter's lower end 49. The threads 17 of the innermost sleeve being open at the upper end 23 thereof, the helical ribs 45, 63 are then advanced into the threads with the ribs of the second sleeve first entering the thread grooves followed by the ribs of the third sleeve. Advancement of the innermost sleeve is continued enough to align and engage the ribs with the main portion of the threaded exterior of the innermost sleeve and dispose the lower end 19 of the innermost sleeve somewhat above the lower end 49 of the second sleeve. By so doing, an annular groove 47 provided on the inner surface adjacent to the lower end 49 of the second sleeve 11 will be exposed an amount sufficient to insert a resilient lock washer or split ring 95 in the groove. The lock ring 95 extends inwardly an amount sufficient to interrupt the path of the innermost sleeve and function as a stop thereby to prevent removal of the innermost sleeve from the lower end of the second sleeve. The innermost sleeve 9 is then retracted into the third sleeve an amount sufficient to cause the third sleeve 13 to move longitudinally with respect to the second sleeve 11 thereby to remove the third sleeve fingers from the lower end wall portion 51, in which position the fingers are no longer biased outwardly. The assembly of three sleeves is next inserted into the outermost sleeve 15 from the lower end 77 thereof and with the bosses 71 of the third sleeve disposed within the longitudinally extending grooves 75 of the outermost sleeve.

The assembly of four sleeves may then be mounted on the rifle by disposing the bracket stud 37 within the upper end of the inner sleeve bore and securing the parts together by the capscrew 35 which is introduced through the bore of the innermost sleeve. Once mounted on the rifle, the closure member 84 is then assembled on the lower end of the outermost sleeve. With the outermost sleeve unlocked from the third sleeve, the outermost sleeve is moved as far as possible toward the upper ends of the other sleeves. In this position, the outside diameter of the third sleeve being slightly smaller than the inside diameter of the closure member cylindrical body portion 87, the closure member is placed over and pressed against the lower end 57 of the third sleeve in a manner to bias the spring ends 93 toward the cap 85. Biasing the spring in this manner allows the cap to be threadedly engaged with the outermost sleeve since the spring ends will be in a position to rotate freely within the channel 81 at the lower end 77 of the outermost sleeve. The closure member is then turned or screwed into the lower end of the outermost sleeve 15 as far as possible after which tension on the spring locking member is released. The closure member is then backed off an amount sufficient to cause the ends 93 of the spring to fall within diametrically opposite slots 79 at the lower end of the outermost sleeve. Thus, the closure member is securely fastened in place and locked against removal or accidental turning.

Once assembled in the manner described above, the outermost sleeve 15 is locked in a position to secure it against longitudinal movement with respect to the third sleeve 13. This is accomplished by rotating the outermost sleeve counterclockwise thereby to cause the ribs 45, 63 of the second and third sleeves to follow the threaded exterior of the innermost sleeve 9. In so doing, the ribs will be guided into alignment and, simultaneous therewith, cause the third and outermost sleeves to move downwardly with respect to the second and innermost sleeves. The downward movement of the third sleeve will move the resilient fingers 67 over the second sleeve's cam surface 53 and bias the fingers outwardly into engagement with the threaded interior of the outermost sleeve to lock the outermost sleeve in place.

Operation

Figure 19:
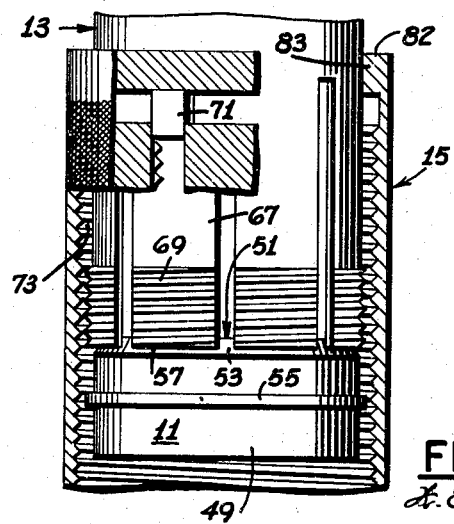
Fig. 19 is a side view, partly in section, of an upper portion of the unipod showing the relative position of the telescopic members, the innermost sleeve being partly withdrawn or extended from the other sleeves.

In use, the unipod of the present invention will be found to operate as follows: starting from a fully inserted position, as illustrated particularly in Figs. 1, 5, 8 and 12 of the drawings, in which position the outermost sleeve 15 is locked against movement with respect to the third sleeve 13, the unipod 1 is extended in one respect by rotating the outermost sleeve in a counterclockwise direction. Rotation in this manner will cause the ribs 45, 63 of the second and third sleeves to follow the helical threads 17 of the innermost sleeve and effect the emergence of the innermost sleeve from the upper ends of the other three sleeves, in the manner shown in Figs. 6, 13 and 19 of the drawings. The extent of withdrawal in this manner is limited by the ribs engaging the annular shoulder 21 at the base 19 of the innermost sleeve, as shown by Fig. 13A of the drawings.

Figure 15:
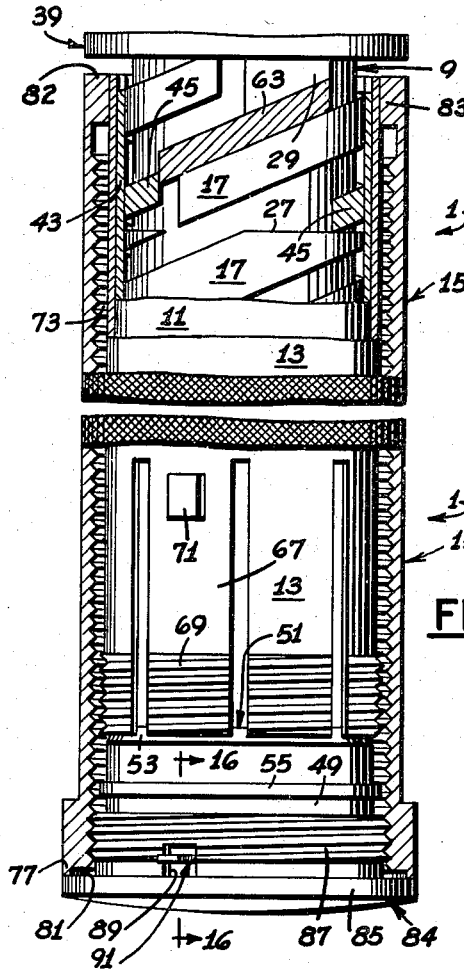
Fig. 15 is a view, similar to Fig. 8, showing the relative position of the telescopic members in the unlocked position of the outermost sleeve.
Figure 18:
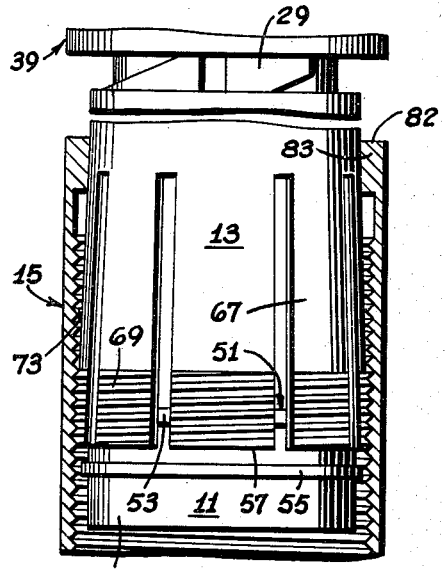
Fig. 18 is a view similar to Fig. 17, but showing the third sleeve in locked engagement with the outermost sleeve.
Figure 17:
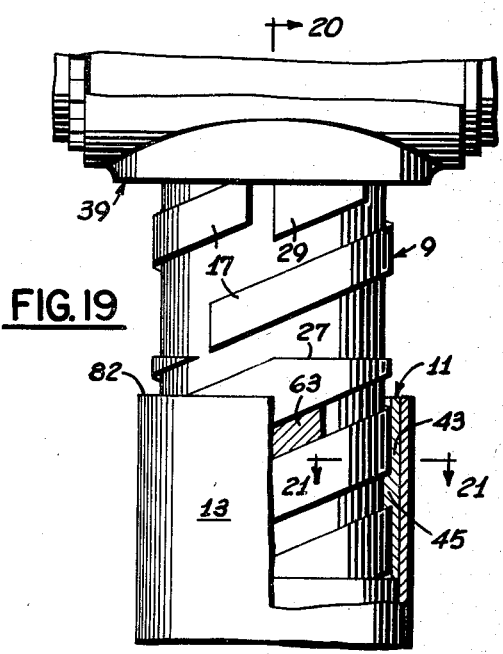
Fig. 17 is a sectional view of an upper portion of the unipod shown in Fig. 15, illustrating the relative position of the telescopic members with the third sleeve being fully extended or withdrawn from the outermost sleeve and in an unlocked position.

In another respect, the unipod may be extended by unlocking the third and outermost sleeve members and sliding them longitudinally with respect to each other. In order to do this, it is necessary that the innermost sleeve be fully retracted or inserted within the second sleeve. This is done by rotating the outermost sleeve clockwise until the ribs 63 of the third sleeve engage the widened land 29 providing a stop at the upper end of the inner sleeve, the position as shown particularly in Figs. 8 and 22 of the drawings. While in this position, the outermost sleeve is pulled downwardly to move the outermost and third sleeves longitudinally with respect to the second and innermost sleeves, thereby to align the ribs 63 of the third sleeve with the run-out thread groove adjacent the stop 29 at the top of the innermost sleeve, as shown in Figs. 14 and 23 of the drawings. Further clockwise rotation of the outermost sleeve will advance the third sleeve ribs into the run-out groove (as shown by Fig. 24 of the drawings) and simultaneously therewith draw the outermost and third sleeves upwardly with respect to the second and innermost sleeves. The widened threads in the vicinity of the cut-away land 29 at the top of the innermost sleeve allows the ribs 45 of the second sleeve to enter the cut-away section (as shown in Fig. 25 of the drawings). In so doing, the third sleeve is permitted to move upwardly with respect to the second sleeve an amount sufficient to remove the threaded ends of the third sleeve's fingers 67 from the lower end wall portion 51 and beyond the cam surface 53 of the second sleeve, while the inner sleeve 9 is prevented from being more fully inserted by the lock ring 95 located at the bottom of the second sleeve 11. In this position, the fingers 67 are no longer biased outwardly and consequently are not engaged with the threaded interior surface 73 of the outermost sleeve. This position is shown particularly in Figs. 15 and 17 of the drawings. In other words, the third and outermost sleeves are no longer in locked engagement, and thus they can be slidably moved longitudinally with respect to each other. Withdrawal of the third sleeve from the upper end of the outermost sleeve is limited by the bosses 71 of the third sleeve engaging the internal annular shoulder 83 at the upper end of the outermost sleeve. Withdrawal of the assembly of the three inner sleeves from the lower end of the outermost sleeve is prevented by the closure member 84. Once the third and outermost sleeves have been adjusted in position relative to each other, the sleeves may again be locked in position by rotating the outermost sleeve in a counterclockwise direction in the manner heretofore explained.

Summary

From the foregoing description, it will be recognized that the unipod of the present invention provides an assembly which is quickly and easily adjustable. Two separate and independent means of adjustment are provided whereby to effect correction for elevation of the article supported thereby. By the one means, elevation may be adjusted quickly to the approximate height after which the other means may be used to correct for minor variations. As a safety measure, the parts are arranged in such a manner that adjustment cannot be effected at the same time by the rotative and sliding movements aforementioned. In other words, the outermost sleeve must be in an adjusted, locked position with respect to the third sleeve before adjustment can be accomplished by rotating the innermost sleeve. On the other hand, the outermost sleeve cannot be unlocked for adjustment before the innermost sleeve is rotated substantially to a fully retracted or inserted position within the second and third sleeves. With this arrangement, positive and accurate adjustments can be made.

Locking and unlocking of the outermost sleeve is accomplished as a function of the interaction of the second and third sleeves by means of which the threaded ends of the third sleeve fingers 67 are biased into engagement with the threaded interior surface of the outermost sleeve. As a result of such an arrangement, the outermost sleeve can be adjusted to any selected position with respect to the third sleeve, that is, in a longitudinally extended sense. Biasing of the third sleeve fingers outwardly is effected by longitudinal movement of the second sleeve with respect to the third sleeve so as to cause the fingers to ride over the cam surface 53 and onto the lower end wall portion 51 of the second sleeve. Relative movement of the second and third sleeves can only be accomplished when their respective ribs 45, 63 are located in the vicinity of the cut-away or widened portion of the threads at the upper end 23 of the innermost sleeve 9, in the manner described above and as particularly shown in the developed views of the drawings, Figs. 22 through 26. It will be observed, however, that mere withdrawal of the innermost sleeve by rotating the outermost sleeve will not unlock the outermost sleeve for adjustment. The stop 29 at the upper end of the innermost sleeve necessitates a longitudinal sliding action of the second and innermost sleeves with respect to the third and outermost sleeves before the parts can be further rotated to an unlocking position. This has been so made in order to prevent collapse of the unipod from an adjusted position of the third and outermost sleeves should an operator be using the innermost sleeve to adjust for height and not realize the relative positions of the third and innermost sleeves.

It should be understood, however, that while the present invention is particularly adapted as an adjustable support for firearms, it may well be applied to other applications wherein similar problems are met. Although a single, preferred embodiment of the present invention has been shown and described, it will undoubtedly be apparent to those skilled in the art that many other forms thereof, as well as changes in the particular one described, are possible within the spirit of the invention. For example, the means for locking the third and outermost sleeves against movement may comprise a friction means rather than the interengageable thread means described herein. Various other changes will, no doubt, readily suggest themselves to those skilled in the art. Therefore, it is desired that the description herein shall be taken merely as illustrative and not as limiting to the specific form herein set forth.

We claim:

1. A unipod comprising first, second, third and fourth cylindrical sleeves arranged in telescopic relation respectively one within the other, the external surface of said first sleeve being threaded throughout the greater portion of its length, the cylindrical surface of said second sleeve being cut away to provide at least one finger extending longitudinally from an end thereof, the inner surface of said finger being provided with a rib disposed in threaded engagement with the threaded surface of said first sleeve whereby said first sleeve is adapted for rotatable adjustment longitudinally with respect to said second sleeve between a position fully inserted within said second sleeve to a position substantially withdrawn therefrom, a portion of the inner surface of said third sleeve adjacent the end thereof respectively associated with said second sleeve's finger being provided with an annular shoulder which has at least one portion cut away to provide a longitudinally disposed groove, said second sleeve finger being disposed within said groove whereby said second and said third sleeves are slidably adjustable in a longitudinal direction with respect to each other, said third sleeve's annular shoulder being provided with thread means disposed in threaded engagement with said first sleeve's threaded surface, the opposite end of said third sleeve being cut away to provide at least one resilient longitudinally extending finger, locking means extending radially outwardly from the free end of said finger, at least one boss on the outer surface of said third sleeve, said fourth sleeve having locking means on the inner surface thereof disposed complementary to said finger's locking means, at least one longitudinally extending groove on the inner surface of said fourth sleeve, said third sleeve's boss being disposed within said groove, and biasing means carried by said second sleeve urging said third sleeve's resilient finger outwardly into locking engagement with said fourth sleeve's locking means.

2. The invention as defined in claim 1 wherein said second sleeve's rib and said third sleeve's thread means are in alignment to form a continuous thread portion engaged within the same thread groove in said first sleeve.

3. The invention as defined in claim 2 wherein a portion of the thread of said first sleeve adjacent to the end of said first sleeve which is associated with said second sleeve's extension is cut away to allow limited longitudinal movement of said third sleeve's thread means with respect to said second sleeve's rib and said first sleeve.

4. The invention as defined in claim 3 wherein said biasing means comprises an annular raised portion on the outer surface of said second sleeve, said raised portion being disposed in a position to bias said resilient finger outwardly in response to longitudinal movement of said second sleeve relative to said third sleeve in the one direction and to release the bias on said resilient finger in response to longitudinal movement of said second sleeve relative to said third sleeve in an opposite direction.

5. The invention as defined in claim 1 and wherein said unipod includes a removable closure member for said sleeves, said closure member comprising a disc-like cap having a cylindrical body portion, the end of said fourth sleeve disposed adjacent to said third sleeve resilient finger comprising a base end, complementary attaching means being provided respectively on the external surface of said cylindrical body portion and on the interior surface of said fourth sleeve base end.

6. The invention as defined in claim 5 and wherein said attaching means comprises complementary threads on said closure member and on said fourth sleeve, and wherein locking means is provided on said closure member and said fourth sleeve to secure said closure member in place.

References Cited in the file of this patent

UNITED STATES PATENTS

| 192,600 | Ryan | July 3, 1877 |
| 608,850 | Folmer | Aug. 9, 1898 |
| 959,291 | Benet et al. | May 24, 1910 |
| 1,593,217 | Lucker | July 20, 1926 |
| 1,829,662 | Krenzke | Oct. 27, 1931 |
| 2,217,533 | Wolarsky | Oct. 8, 1940 |
| 2,472,804 | Bird | June 14, 1949 |

FOREIGN PATENTS

| 692,032 | France | July 28, 1930 |
| 172,279 | Switzerland | Dec. 17, 1934 |